Sept. 20, 1927.
A. ORDWAY
TRAILER
Filed April 20, 1926
1,642,823
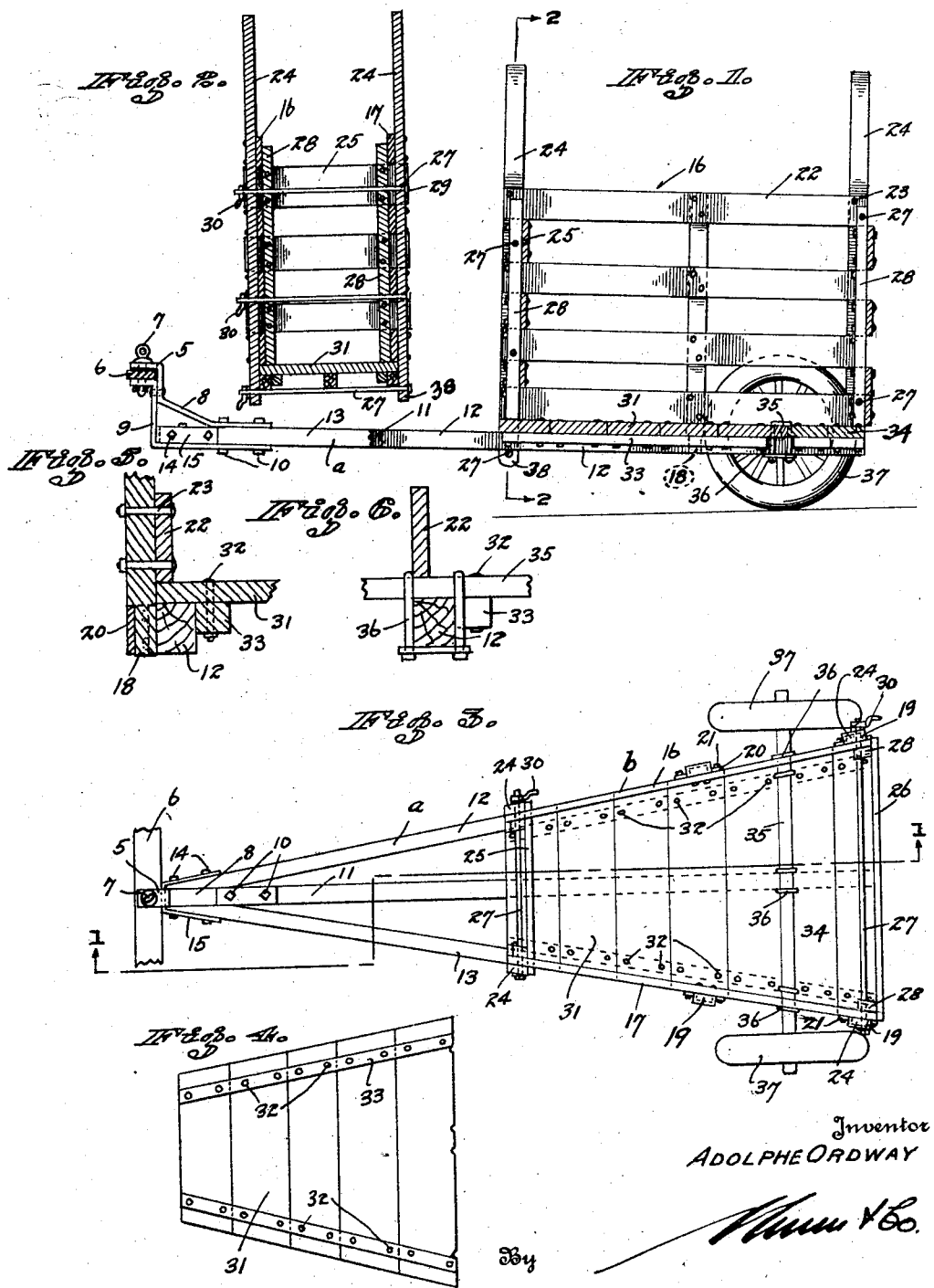
Inventor
ADOLPHE ORDWAY Patented Sept. 20, 1927.

1,642,823

UNITED STATES PATENT OFFICE.

ADOLPHE ORDWAY, OF NEWMAN, CALIFORNIA.

TRAILER.

Application filed April 20, 1926. Serial No. 103,331.

The present invention relates to improvements in road vehicles of the type known as trailers.

The invention proposes a construction in trailers operating to adapt these devices to lend themselves readily to the transportation of animals, such as horses and cattle.

The general object of the invention is the provision of a trailer relatively light in weight yet capable of sustaining a relatively heavy load, and in adapting the trailer to be readily connected to the rear end portion of a motor vehicle or other traction device.

A further object is the provision of a body construction in trailers adapted for conveniently accommodating an animal, such as a horse, and adapted for confining the animal against escape while in transit.

A still further object is the provision of a trailer for use in connection with transporting animals from place to place and constructed so as to simplify the operations of loading and unloading.

The above and other objects are accomplished by instrumentalities pointed out in the following specification.

The invention is clearly defined in the claims.

A satisfactory embodiment of the invention is illustrated in the accompanying drawings forming part of the specification and in which Figure 1 is a vertical longitudinal section of the invention taken approximately on the line 1—1 of Figure 3.

Figure 2 is a vertical cross section taken approximately on the line 2—2 of Figure 1.

Figure 3 is a plan view of the trailer.

Figure 4 is a bottom plan view of one of the floor sections.

Figure 5 is a cross sectional detail showing the connection between one of the side members and the frame, and Figure 6 is a view similar to Figure 5, but showing the connection between the axle and one of the frame members.

In carrying out the invention I provide a frame $a$ which is substantially triangular in contour and for the sake of lightness is formed of wood. The particular material employed in the construction of the frame of the present invention is not of the essence so that materials other than wood may be employed whenever desired. The frame $a$ is of ample length for accommodating a body $b$ which also may be of wood. The body $b$ is located upon the wider end portion of the frame $a$ and the narrower end portion of the frame $a$ is provided with a clevis 5 adapted for receiving a cross bar 6 at the rear end portion of a motor vehicle and the like, so that when a coupling pin 7 is passed through openings in the clevis 5 and through an opening in the cross bar 6, the device of the present invention becomes effectively connected to the motor vehicle.

Straps 8 and 9, which cooperate to provide the clevis 5, are secured as by bolts 10 to the upper and lower sides of the intermediate bar 11 of the frame $a$. The side bars 12 and 13 of the frame $a$ diverge rearward and are disposed to opposite sides of the intermediate bar 11. At their forward ends the side bars 12 and 13 are connected to the intermediate bar in any preferred manner, as by bolts 14 extending transversely through the forward ends of said bars and through a substantially U-shaped strap 15 disposed so as to straddle the forward end portion of the frame $a$. The body $b$ is constructed so as to provide ample accommodation for the body of an animal. In instances where the device is used for transporting a relatively large animal, such as a horse, the neck and head of the animal may project beyond the forward end of the body $b$ and into the space between the body and the traction vehicle, while the remainder of the animal will be disposed within the body $b$. The side members 16 and 17 of the body $b$ have at their rear end portions, and preferably also at their intermediate portions, depending tongues 18, which fit into sockets 19 formed of U-shaped straps 20 bolted, as shown at 21, or otherwise secured to the outer faces of the side members 12 and 13. For the sake of lightness, simplicity and cheapness in construction, I have shown the side members 16 and 17 as being formed of longitudinally disposed strips 22 bolted, as shown at 23, to vertically extending end pieces 24 which project above the uppermost of the strips 22. With this construction, the upwardly projecting portions of the forward end pieces 24 provide spaced bars for receiving the neck and head of the animal therebetween and by their presence operate to prevent the animal from turning its neck and head or otherwise displacing its body while in transit. The body $b$ also consists of an end member 25, which is interposed between the forward end portions of the side members 16 and 17, and an end member 26, which with its ends preferably overlaps the rearward end portions of the side members. These end members are readily removable from their positions at the side members and are adapted for conveniently and detachably having the side members secured thereto. I also provide tie rods 27 of different lengths and dispose the relatively short tie rods so as to extend through openings in the forward end pieces 24 and the forward ends of the strips 22 and through the forward pair of uprights 28, which form parts of the respective end members 25 and 26, the tie rods at one end being provided with heads 29, and their opposite ends extending beyond one of the side members of the body b and being screw-threaded and extending through wing nuts 30, which cooperate with the heads 29 to connect the end members and the side members together. The relatively long tie rods 27 are similarly disposed so as to extend through the respective side members 16 and 17 and through the rearward pair of uprights 28 for the end member 26, so that, by the arrangement of the end members 25 and 26 relative to the side members 16 and 17, the members are adapted to be clamped together.

31 is a forward floor section in the body b. This section is secured, as shown at 32, to cleats 33 which are arranged upon the lower side of the section and disposed so as to bear upon the inner faces of the sides 12 and 13 of frame a and thereby operate to prevent lateral displacement of the floor section. 34 indicates a floor section located in the rear end portion of the body b and constructed similarly to the floor section 31. The floor sections 31 and 34 are disposed on opposite sides of an axle 35, which is arranged transversely to the frame a and is secured in any preferred manner, as by U-bolts 36, to the intermediate portion 11 and the opposite side portions 12 and 13 of the frame. Suitable traction wheels 37 are mounted upon the end portions of the axle 35 and are connected thereto in the usual manner.

The forward end pieces 24 are preferably so formed that, when the body b is placed in position on the frame a, they extend below the frame, as shown at 38, and the extensions 38 have openings therein, so that one of the short rods 27 may be inserted therethrough and secured to the extensions in the manner already explained in regard to the other tie rods 27. Thus, while the floor sections 31 and 34, by their engagement with the side portions 12 and 13, and the depending tongues 18, by their engagement with the respective sockets 19, prevent a sliding movement of the body b upon the frame, the lowermost tie rod 27, by its engagement with the underside of the frame, prevents an upward movement of the body relative to the frame, so that the body is securely retained in its position thereon.

From the foregoing it is to be observed that the body b by reason of its sloped side members 16 and 17 is ideally adapted for accommodating an animal, such as a horse, and confining the animal during transportation.

The running gear made up of the axle 35 and the wheels 37 may correspond with that forming the front axle and the wheels of an ordinary motor vehicle of the Ford type. The provision of this form of running gear gives a low center of gravity to the trailer and, at the same time, enables the user to load and unload the device with great facility. The construction and arrangement of the parts, as will be noted, produce a device of relatively light weight so that the loaded trailer may be drawn with a minimum of effort on the part of the motor vehicle.

In the position of the frame a, as shown in Figure 1, the floor sections 31 and 34 are virtually in the same plane as the wheel axis. It may be desirable, however, on some occasions, for instance, when the trailer is to traverse a very rough ground, to have the floor sections raised above the wheel axis. The frame a is then easily reversed and is thereby raised so that its top is virtually as much above the wheel axis as, in the normal, low position of the frame, its bottom is below the axis, and the body b is slipped into place on the frame, the floor sections engaging the side portions 12 and 13, the depending tongues 18 fitting in the respective sockets 19, and one of the short tie rods 27 being inserted through the extensions 38 below the side portions of the frame and thus retaining the body b on the frame in the same manner as when the frame is in its low position. In order to attach the trailer to the rear end of a vehicle when the frame a is in this inverted and raised position, it is desirable, although not absolutely necessary, to substitute for the clevis 5, which is shown as being in an offset relation to the frame, a connection in alignment with the frame so as to hold the trailer in an almost horizontal position, as shown in Figure 1, but, since such a connection and the means for securing it to the frame and the vehicle are readily understood from the connecting means already described, a detailed description and an illustration thereof are deemed superfluous and are therefore omitted.

Although I have shown and described one embodiment of my invention, it is to be understood that the same is susceptible of various changes; and I reserve the right to employ such as may come within the scope of the appended claims.

I claim:

1. A trailer comprising a substantially triangularly shaped frame, means on the narrow end of the frame for connecting the same to a vehicle, an axle disposed transversely of the wider end of the frame, traction wheels mounted upon the axle, a body superimposed on the wider end portion of the frame and disposed with one end in spaced relation to the narrow end of the frame, said body comprising a floor having converging sides, converging side members connected to the opposite sides of the frame, the ends of the said side members adjacent to the narrow end of the frame having vertical extensions and providing an intervening space for the head and neck of an animal and transversely disposed end members connected to the opposite end portions of the side members.

2. A trailer comprising a triangularly shaped frame, traction wheels for supporting said frame, a body superimposed on the wider end portion of the frame and disposed with one end in spaced relation to the narrow end of the frame, said body having side and end members, and vertical extensions for supporting said members and providing an intervening space for the head and neck of an animal.

ADOLPHE ORDWAY.